United States Patent Office 3,351,517
Patented Nov. 7, 1967

3,351,517
COVULCANIZING PROCESS
William D. Willis, Wilmington, Del., assignor to Hercules Incorporated, a corporation of Delaware
No Drawing. Filed Apr. 27, 1964, Ser. No. 362,999
7 Claims. (Cl. 161—184)

This invention relates to covulcanizing epihalohydrin polymers with sulfur-curable rubbers and to the resulting covulcanizates. More particularly, the invention relates to covulcanizing epihalohydrin polymers with sulfur-curable rubbers by heating in the presence of an organic accelerator, a metal salt or oxide and sulfur, and to the resulting covulcanizates. As used herein, the term "covulcanizing" refers to the treatment of blends (alloys) or plies of two or more polymers to form vulcanized polymer blends or laminates.

It is desirable to blend sulfur-curable rubbers with epihalohydrin polymers to improve the low temperature flexibility of the polymers. It is also desirable to employ blends of sulfur-curable rubbers with epihalohydrin polymers as inner liners to reduce the air permeability of various sulfur-curable rubbers. However, until the present invention, such blends and laminates were not fully useful since it had not been possible to covulcanize epihalohydrin polymers with sulfur-curable rubbers. The sulfur formulations normally employed to vulcanize sulfur-curable rubbers have an adverse effect on the diamines normally employed to vulcanize (i.e., cross-link) epihalohydrin polymers.

It has now unexpectedly been found that epihalohydrin polymers can be covulcanized with sulfur-curable rubbers if a certain specific combination of vulcanizing agents is used. This combination comprises a mixture of at least one organic accelerator as defined below, sulfur and at least one salt or oxide of a metal of Groups II–A, II–B, III–A, IV–A, or V–A of the periodic table (Lang's Handbook of Chemistry, vol. 8, pages 56–57 (1952)).

Any epihalohydrin polymer, i.e., homopolymer or copolymer of an epihalohydrin as, for example, epicholorohydrin or epibromohydrin homopolymers, copolymers of two different epihalohydrins, or copolymers of an epihalohydrin with at least one other vicinal monoepoxide can be employed in the covulcanizations of this invention. These polymers are readily prepared by the polymerization of epihalohydrins with, for example, organoaluminum compounds as catalysts. Particularly effective catalysts for the polymerization of epihalohydrins are alkylaluminum compounds that have been reacted with from about 0.2 to about 1 mole of water per mole of alkylaluminum compound. The polymers obtained by these catalysts may be essentially wholly amorphous or crystalline or they may be a mixture of the amorphous and crystalline polymers. Generally, the amorphous polymers provide the most rubbery vulcanizates.

When epihalohydrins are polymerized by the above process, polymerization takes place at least in major part through the epoxide linkage so that the product is a polyether containing halomethyl groups attached to the main polymer chain. The homopolymers can be shown as follows:

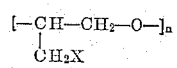

where X is halogen. In the same way, when an epihalohydrin is copolymerized with one or more other epoxides (including other epihalohydrins), polymerization takes place through the epoxide linkage even though other polymerizable groups may be present. Typical epoxides that can be copolymerized with an epihalohydrin to produce a copolymer that can be covulcanized in accordance with this invention are the alkylene oxides such as ethylene oxide, propylene oxide, butene oxide, etc.; butadiene monoxide, cyclohexene oxide, vinyl cyclohexene oxide, epoxide ethers such as ethyl glycidyl ether, 2-chloroethyl glycidyl ether, hexyl glycidyl ether, allylphenyl glycidyl ether, allyl glycidyl ether, etc. These polymers will have an RSV of at least about 0.2 and preferably at least about 0.5. By the term "RSV" (Reduced Specific Viscosity) is meant the specific viscosity divided by the concentration of the solution in grams per 100 milliliters, measured at the indicated temperature, on a solution containing 0.1 gram of the polymer or rubber in 100 milliliters of the solution.

Any sulfur-curable rubber can be covulcanized with one or more of the above epihalohydrin polymers in accordance with this invention. Exemplary sulfur-curable rubbers are styrene-butadiene rubber, natural rubber, polychloroprene, acrylonitrile-butadiene rubber, isoprene-isobutylene rubber, ethylene-propylene-diene terpolymers, cis-polybutadiene, cis-polyisoprene-lower alkylene oxide-allyl glycidyl ether copolymers such as propylene oxide-allyl glycidyl ether copolymer, etc.

As stated above, blends or plies of an epihalohydrin polymer and a sulfur-curable rubber can be covulcanized by heating with an organic accelerator, sulfur and a metal salt or oxide. Exemplary of the organic accelerators which can be used are 2-mercaptoimidazoline, 2-mercaptopyrimidine, thiourea and trialkyl substituted thiourea. The metal salts and oxides used will be selected from the salts of aromatic carboxylic acids, salts of aliphatic carboxylic acids, salts of carbonic acid, salts of phosphorous acid, salts of silicic acid and oxides of the metals of Groups II–A, II–B, III–A, IV–A and V–A. Exemplary metal salts and oxides are stannic oxide, lead monoxide, red lead oxide, germanium monoxide, calcium oxide, zinc oxide, magnesium oxide, molybdenum dioxide, aluminum oxide, antimony trioxide, antimony pentaoxide, zinc carbonate, lead carbonate, dibasic lead carbonate, calcium carbonate, mercuric carbonate, beryllium carbonate, lead orthosilicate, barium silicate, cadmium silicate, magnesium silicate, aluminum silicate, dibasic lead phthalate, magnesium benzoate, calcium benzoate, zinc salicylate, strontium salicylate, lead oleate, dibasic lead stearate, dibasic lead phosphite, magnesium phosphite, etc. Those metal compounds containing lead are most preferred since, in addition to aiding the cross-linking, they tend to increase the stability of the product against heat and oxidation degradation. Therefore, it may be desirable to add at least a small amount of a lead compound even when one or more other metal compounds are being used to aid in cross-linking. The relative proportions of the different vulcanizing ingredients will vary, depending upon the specific ingredients used, the polymers to be vulcanized and the amount of vulcanization desired. However, in general from about 0.5% to about 10% of organic accelerator, based on the total elastomer (total polymer and rubber), from about 0.1% to about 10% of sulfur, based on total elastomer, and from about 0.5% to about 50% of metal salt or oxide, based on total elastomer, will be used. It may be desirable in certain cases to add auxiliary or secondary accelerators. Exemplary secondary accelerators are the guanidines such as di-orthotolyl guanidine, thiazoles such as mercaptobenzothiazoles, and certain amine based accelerators such as butyraldehyde-aniline condensation.

As stated above, the covulcanizable compositions of this invention are either blends or plies. In the case of covulcanizable blends, the amount of the epihalohydrin polymer can be varied within wide limits, depending on the specific product desired. However, in general the amount of epihalohydrin polymer will vary from about 20% to about 90% by weight of the blend. The blends can be prepared by any of the conventional rubber blending methods. For example, the epihalohydrin polymer and sulfur-curable rubber can merely be blended on a 2-roll mill with the vulcanizing agents preferably being added after the other components are thoroughly blended. Another method is to prepare separate solutions of the polymer and rubber, then mix them together, evaporate the solvent, and mix in the vulcanizing agents. In the case of covulcanizable plies to form laminates, the vulcanizing agent will be blended individually with the polymer and rubber before they are laid up. In either the case of blends or plies, covulcanizing will be accomplished by heating the covulcanizable composition under pressure. In general, the curing temperatures will vary from about 250° F. to about 360° F. and the pressure from about 50 p.s.i. to about 500 p.s.i.

In addition to the vulcanizing agents, other ingredients can be incorporated. The additives normally employed in rubber vulcanization can be used here also, as for example, extenders, fillers, pigments, plasticizers, stabilizers, antioxidants, softeners, etc. The presence of a filler, and, in particular, carbon black, is beneficial and, as in rubber compounding, gives optimum results. The vulcanized products, particularly those containing reinforcing fillers and antioxidants, demonstrate performance properties which have practical utility in applications requiring oil resistance, heat and flame resistance, chlorinated solvent resistance, ozone resistance, and low temperature flexibility. Obviously there are cases in which an additive is not required or desired and excellent results are achieved when only the vulcanizing agents are added.

The following examples are for purposes of illustration, parts and percentages being by weight unless otherwise specified.

*Examples 1–5*

These examples demonstrate the covulcanization of a polyepichlorohydrin (having an RSV of 1.4 as determined in α-chloronaphthalene at a temperature of 100° C.) with a cis-4-polybutadiene (having Mooney viscosity of 46, ML-4 at 212° F.). Each polymer initially contained a small amount of phenyl-β-naphthylamine antioxidant. The covulcanizable formulations were compounded on a 2-roll mill at a temperature of 125 to 165° F. for 20 minutes. The ingredients in each formulation are tabulated below.

| Ingredients (Parts) | Ex. 1 | Ex. 2 | Ex. 3 | Ex. 4 | Ex. 5 |
|---|---|---|---|---|---|
| Polyepichlorohydrin | 100 | 90 | 80 | 50 | |
| Cis-4-polybutadiene | | 10 | 20 | 50 | 100 |
| Fast extrusion furnace black | 57.5 | 57.5 | 57.5 | 57.5 | 57.5 |
| Aromatic processing oil | 15.0 | 15.0 | 15.0 | 15.0 | 15.0 |
| Polymerized trimethyl-dihydroquinoline | 1.0 | 1.0 | 1.0 | 1.0 | 1.0 |
| Red lead | 5.0 | 4.5 | 4.0 | 2.5 | |
| Zinc oxide | | 0.5 | 1.0 | 2.5 | 5.0 |
| Stearic acid | | 0.1 | 0.2 | 0.5 | 1.0 |
| 2-mercaptoimidazoline | 1.5 | 1.5 | 1.5 | 1.5 | 1.5 |
| Sulfur | 1.0 | 1.1 | 1.2 | 1.5 | 2.0 |

In the above compounding, the polymers were added first to the mill, followed by the aromatic processing oil, and then the other ingredients were added. Each formulation was cured in a steel press for 45 minutes at a temperature of 310° F. The resulting vulcanizates were tested and their physical properties are tabulated below.

| Properties | Ex. 1 | Ex. 2 | Ex. 3 | Ex. 4 | Ex. 5 |
|---|---|---|---|---|---|
| Modulus at 300% elongation, p.s.i. | >1,900 | 1,955 | 1,985 | 1,960 | 1,885 |
| Tensile strength, p.s.i. | 2,025 | 1,970 | 2,040 | 1,960 | 1,985 |
| Elongation, percent | 185 | 305 | 310 | 300 | 330 |
| Shore Hardness (A-2) | 71 | 71 | 71 | 75 | 61 |
| Break set, percent | 10 | 15 | 15 | 10 | 5 |
| Volume percent swelling in No. 3 oil after soaking for 70 hrs. at 212° F. (ASTM-D-1460-57T) | 0 | 16 | 26 | 100 | 224 |
| Ozone crack resistance, time to first crack in hrs.[1] | >100 | >100 | >100 | >100 | 1 |
| Compression set, percent[2] | 74 | 73 | 69 | 66 | 48 |
| Low temperature flexibility, °C.[3] | −17 | −18 | −21 | −34 | <−55 |
| Specific gravity | 1.475 | 1.431 | 1.390 | 1.281 | 1.133 |

[1] Tested in an ozone cabinet using 125 parts per hundred million at 100° F.
[2] ASTM 395–55, Method B, 70 hrs. at 212° F.
[3] Clash and Berg T10,000.

*Examples 6–11*

These examples demonstrate the covulcanization of a polyepichlorohydrin (having an RSV of 1.4 as determined in α-chloronaphthalene at 100° C.) with cis-4-polybutadiene (having a Mooney viscosity of 46). Each polymer initially contained a small amount of conventional rubber antioxidant. The polyepichlorohydrin contained a very small amount of catalyst residue (primarily alkoxy aluminum oxides). Samples of each polymer were dissolved in toluene and blended in the amounts shown below. The toluene was then allowed to evaporate and the resulting blends compounded on a 2-roll mill at a temperature of 125 to 160° F. for 20 minutes. The ingredients added to form the final covulcanizable formulations are tabulated below.

| Ingredients (Parts) | Ex. 6 | Ex. 7 | Ex. 8 | Ex. 9 | Ex. 10 | Ex. 11 |
|---|---|---|---|---|---|---|
| Polyepichlorohydrin | 50 | 60 | 70 | 80 | 100 | |
| Cis-4-polybutadiene | 50 | 40 | 30 | 20 | | 100 |
| Fast extrusion furnace black | 50 | 50 | 50 | 50 | 50 | 50 |
| Red lead | 2.5 | 3.0 | 3.5 | 4.0 | 5.0 | |
| Zinc oxide | 2.5 | 2.0 | 1.5 | 1.0 | | 5.0 |
| Zinc stearate | | | | | 1.0 | |
| Stearic acid | 0.5 | 0.4 | 0.3 | 0.2 | | 1.0 |
| Polymerized trimethyl-dihydroquinoline | 1.0 | 1.0 | 1.0 | 1.0 | 1.0 | 1.0 |
| 2-mercaptoimidazoline | 1.5 | 1.5 | 1.5 | 1.5 | 1.5 | 1.5 |
| Di-ortho tolylguanidine | 1.0 | 1.0 | 1.0 | 1.0 | 1.0 | 1.0 |
| Sulfur | 1.25 | 1.1 | 0.95 | 0.8 | 0.5 | 2.0 |

Each formulation was cured in a steel mold at 310° F. A sample of each vulcanizate was heat aged in a circulating air oven for three days at a temperature of 250° F. Both the aged and unaged vulcanizates were tested to determine their physical properties. The results of these tests and the time in minutes each sample was cured are tabulated below.

| Properties | Cure time, min. | Ex. 6 | | Ex. 7 | | Ex. 8 | | Ex. 9 | | Ex. 10 | | Ex. 11 | |
|---|---|---|---|---|---|---|---|---|---|---|---|---|---|
| Raw Polymer Mooney viscosity [1] | | 46 | | 48 | | 48 | | 43 | | 34 | | 46 | |
| Mooney scorch,[2] minutes to 5-point rise | | 6 | | 7 | | 7 | | 9 | | 12 | | 9 | |
| | | Un-aged | Aged | Un-aged | Aged | Un-aged | Aged | Un-aged | Aged | Un-aged | Aged | Un-aged | Aged |
| Modulus at 100% elongation, p.s.i | 30 | 855 | ------ | 1,155 | ------ | 1,290 | 2,470 | 1,410 | ------ | 780 | 1,390 | 560 | 1,370 |
| | 45 | 1,035 | ------ | 1,150 | ------ | 1,320 | 2,215 | 1,475 | 2,180 | 925 | 1,500 | 535 | 1,300 |
| Modulus at 200% elongation, p.s.i | 30 | 1,985 | ------ | >1,800 | ------ | 2,470 | ------ | 2,470 | ------ | 1,575 | ------ | 1,255 | ------ |
| | 45 | 2,120 | ------ | 2,370 | ------ | ------ | ------ | 2,500 | ------ | 1,865 | ------ | 1,195 | ------ |
| Tensile strength, p.s.i | 30 | 2,455 | 1,945 | 2,040 | 2,185 | 1,985 | 2,520 | 2,580 | 2,195 | 2,035 | 2,180 | 2,570 | 1,415 |
| | 45 | 2,510 | 1,760 | 2,370 | 2,075 | 2,090 | 2,530 | 2,435 | 2,560 | 2,355 | 2,870 | 2,345 | 1,810 |
| Elongation, percent | 30 | 245 | 80 | 185 | 85 | 150 | 100 | 210 | 95 | 295 | 140 | 360 | 100 |
| | 45 | 250 | 85 | 200 | 90 | 155 | 105 | 185 | 130 | 310 | 170 | 330 | 125 |
| Shore Hardness (A-2) | 30 | 75 | 86 | 79 | 88 | 80 | 89 | 81 | 91 | 74 | 84 | 69 | 77 |
| | 45 | 76 | 85 | 76 | 86 | 80 | 88 | 81 | 90 | 78 | 85 | 69 | 77 |
| Break set, percent | 30 | 0 | 0 | 0 | 0 | 0 | 0 | 0 | 0 | 10 | 0 | 0 | 0 |
| | 45 | 0 | 0 | 0 | 0 | 0 | 0 | 10 | 0 | 10 | 0 | 0 | 0 |
| Specific gravity | 45 | 1.301 | | 1.352 | | 1.402 | | 1.459 | | 1.521 | | 1.130 | |
| Ozone crack resistance, time to first crack in hrs.[3] | 30 | 2 | | 14 | | 55 | | 301 | | 229 | | 0.5 | |
| Volume percent swelling in No. 3 oil after soaking for 70 hrs. at 212° F. (ASTM-D-1460-57T) | 30 | 95 | | 62 | | 42 | | 33 | | 8 | | 174 | |
| | 45 | 84 | | 62 | | 42 | | 24 | | 8 | | 160 | |
| Bell brittleness temperature,[4] ° C | 45 | <−70 | | <−70 | | −62 | | −37 | | −18 | | <−70 | |
| Compression set, percent [5] | 60 | 58 | | 56 | | 51 | | 47 | | 68 | | 40 | |

[1] ML-4 at 212° F.  [2] MS at 250° F.  [3] Tested in an ozone cabinet using 125 parts per hundred million at 100° F.  [4] ASTM D-746.  [5] ASTM 395-55, Method B, 70 hrs. at 212° F.

Examples 12–13

These examples demonstrate the covulcanization of plies to form a laminate. Samples of the covulcanizable formulations from Examples 10 and 11 were sheeted off the 2-roll mill as 100-mil slabs. A laminate was prepared from a ply cut from each slab. The surface of the piles was first wet with a small amount of toluene, then the plies were sandwiched together and cured for 45 minutes at a temperature of 155° C. under a pressure of 150 p.s.i. A strip of aluminum foil, inserted between the plies at one end, provided grip tabs for testing. For purposes of comparison, 100-mil slabs of polyepichlorohydrin and cis-4-polybutadiene, containing no vulcanizing agents, were laminated in the exact same way. The strength of the adhesion between the plies of the vulcanized sample was markedly increased over that of the unvulcanized sample.

Examples 14–17

These examples demonstrate the effect of omitting either the organic accelerator, the metal oxide or sulfur from the covulcanizable composition. Samples of the polyepichlorohydrin and cis-4-polybutadiene described in Examples 6–11 were dissolved in toluene then blended together. The toluene was allowed to evaporate and samples of the resulting blend were compounded on a 2-roll mill at 125 to 160° F. for 20 minutes. The amounts of ingredients added in each formulation are tabulated below.

| Ingredients | Ex. 14 | Ex. 15 | Ex. 16 | Ex. 17 |
|---|---|---|---|---|
| Polyepichlorohydrin | 80 | 80 | 80 | 80 |
| Cis-4-polybutadiene | 20 | 20 | 20 | 20 |
| Fast extrusion furnace black | 50 | 50 | 50 | 50 |
| Red lead | 2 | 2 | ------ | 2 |
| Zinc oxide | 1 | 1 | ------ | ------ |
| Stearic acid | .2 | .2 | .2 | .2 |
| Polymerized trimethyldihydroquinoline | 1 | 1 | 1 | 1 |
| 2-mercaptomidazoline | 1.5 | ------ | 1.5 | 1.5 |
| Di-ortho tolylguanidine | 1 | 1 | 1 | 1 |
| Sulfur | ------ | .8 | .8 | .8 |

Each formulation was cured in a steel mold at a temperature of 310° F. The resulting covulcanizates were tested to determine their physical properties. The results of these tests and the time in minutes each sample was cured are tabulated below.

| Properties | Cure time, min. | Ex. 14 | Ex. 15 | Ex. 16 [1] | Ex. 17 |
|---|---|---|---|---|---|
| Modulus at 200% elongation | 30 | 1,270 | 740 | 1,670 | 2,470 |
| | 45 | 1,480 | 680 | 1,700 | 2,500 |
| Tensile strength, p.s.i | 30 | 1,480 | 740 | 2,150 | 2,580 |
| | 45 | 1,535 | 680 | 2,250 | 2,435 |
| Elongation, percent | 30 | 270 | 200 | 280 | 210 |
| | 45 | 200 | 210 | 300 | 185 |
| Shore Hardness (A-2) | 30 | 70 | 67 | 71 | 81 |
| | 45 | 71 | 73 | 70 | 81 |

[1] It should be noted that the values in this column would have been even poorer if it had not been for the very small amount of catalyst residue (alkoxy aluminum oxides) present in the polyepichlorohydrin.

What I claim and desire to protect by Letters Patent is:
1. The process of covulcanizing an epihalohydrin polymer selected from the group consisting of epihalohydrin homopolymers, copolymers of an epihalohydrin with alkylene oxides or saturated epoxide ethers and copolymers of epichlorohydrin with at least one other epihalohydrin, with a sulfur-curable rubber selected from the group consisting of styrene-butadiene rubber, natural rubber, polychloroprene, acrylonitrile-butadiene rubber, isoprene-isobutadiene rubber, etheylene-propylene-diene terpolymers, cis-polybutadiene, cis-polyisoprene and lower alkylene oxide-allyl glycidyl ether copolymers which comprises heating said polymer and rubber with (1) at least one organic accelerator selected from the group consisting of 2-mercaptoimidazoline, 2-mercaptopyrimidine, thiourea and trialkyl substituted thiourea, (2) at least one metal compound selected from the group consisting of the salts of aromatic carboxylic acids, salts of aliphatic carboxylic acids, salts of carbonic acid, salts of phosphorous acid, salts of silicic acid and oxides of metals of Groups II–A, II–B, III–A, IV–A and V–A of the periodic table, and (3) sulfur.

2. The process of claim 1 wherein the organic accelerator is 2-mercaptoimidazoline.

3. The process of claim 1 wherein the metal compound is a lead oxide.

4. The process of claim 1 wherein the epihalohydrin polymer is polyepichlorohydrin and the sulfur-curable rubber is cis-4-polybutadiene.

5. A covulcanized composition comprising a blend of an epihalohydrin polymer selected from the group consisting of epihalohydrin homopolymers, copolymers of an epihalohydrin with alkylene oxides or saturated epoxide ethers and copolymers of epichlorohydrin with at least one other epihalohydrin, and at least one sulfur-curable rubber, selected from the group consisting of styrene-butadiene rubber, natural rubber, polychloroprene, acrylonitrile-butadiene rubber, isoprene-isobutadiene rubber, ethylene-propylene-diene terpolymers, cis-polybutadiene, cis-polyisoprene and lower alkylene oxide-allyl glycidyl ether copolymers, said blend having been vulcanized with an organic accelerator selected from the group consisting of 2-mercaptoimidazoline, 2-mercaptopyrimidine, thiourea and trialkyl substituted thiourea, a metal compound selected from the group consisting of the salts of aromatic carboxylic acids, salts of aliphatic carboxylic acids, salts of carbonic acid, salts of phosphorous acid, salts of silicic acid and oxides of metals of Groups II–A, II–B, III–A, IV–A and V–A of the periodic table, and sulfur.

6. A covulcanized laminate comprising at least two strongly bonded plies, at least one ply comprising a vulcanized epihalohydrin polymer selected from the group consisting of epihalohydrin homopolymers, copolymers of an epihalohydrin with alkylene oxides or saturated epoxide ethers and copolymers of epichlorohydrin with at least one other epihalohydrin, and at least one other ply comprising a vulcanized sulfur-curable rubber selected from the group consisting of styrene-butadiene rubber, natural rubber, polychloroprene, acrylonitrile-butadiene rubber, isoprene-isobutadiene rubber, ethylene-propylene-diene terpolymers, cis-polybutadiene, cis-polyisoprene and lower alkylene oxide-allyl glycidyl ether copolymers, said laminate having been covulcanized with an organic accelerator selected from the group consisting of 2-mercaptoimidazoline, 2-mercaptopyrimidine, thiourea and trialkyl substituted thiourea, a metal compound selected from the group consisting of the salts of aromatic carboxylic acids, salts of aliphatic carboxylic acids, salts of carbonic acid, salts of phosphorous acid, salts of silicic acid and oxides of metals of Groups II–A, II–B, III–A, IV–A and V–A of the periodic table, and sulfur.

7. A covulcanizable composition comprising (1) an epihalohydrin polymer selected from the group consisting of epihalohydrin homopolymers, copolymers of an epihalohydrin with alkylene oxides or saturated epoxide ethers and copolymers of epichlorohydrin with at least one other epihalohydrin, (2) at least one sulfur-curable rubber selected from the group consisting of styrene-butadiene rubber, natural rubber, polychloroprene, acrylonitrile-butadiene rubber, isoprene-isobutadiene rubber, ethylene-propylene-diene terpolymers, cis-polybutadiene, cis-polyisoprene and lower alkylene oxide-allyl glycidyl ether copolymers, (3) at least one organic accelerator selected from the group consisting of 2-mercaptoimidazoline, 2-mercaptopyrimidine, thiourea, (4) at least one metal compound selected from the salts of aromatic carboxylic acids, salts of aliphatic carboxylic acids, salts of carbonic acid, salts of phosphorous acid, salts of silicic acid and oxides of metals of Groups II–A, II–B, III–A, IV–A and V–A of the periodic table, and (5) sulfur.

References Cited

UNITED STATES PATENTS

| | | | |
|---|---|---|---|
| 2,126,269 | 8/1938 | Messer | 260—779 |
| 2,933,117 | 4/1960 | Baldwin et al. | 260—888 |
| 3,158,591 | 11/1964 | Vandenberg | 260—2 |
| 3,275,598 | 9/1966 | Garty et al. | 260—2 |
| 3,285,804 | 11/1966 | Robinson | 161—239 |
| 3,285,862 | 11/1966 | Vandenberg | 260—2 |
| 3,287,287 | 11/1966 | Willis | 260—2 |

FOREIGN PATENTS 524,051    4/1956    Canada.

SAMUEL H. BLECH, *Primary Examiner.*

MURRAY TILLMAN, *Examiner.*

M. J. TULLY, *Assistant Examiner.*

UNITED STATES PATENT OFFICE
CERTIFICATE OF CORRECTION

Patent No. 3,351,517　　　　　　　　　　　　November 7, 1967

William D. Willis

It is hereby certified that error appears in the above numbered patent requiring correction and that the said Letters Patent should read as corrected below.

Column 3, line 18, after "condensation" insert -- products --; column 8, line 17, after "thiourea" insert -- and trialkyl substituted thiourea --.

Signed and sealed this 26th day of November 1968.

(SEAL)
Attest:

Edward M. Fletcher, Jr.　　　　　　　　　　EDWARD J. BRENNER
Attesting Officer　　　　　　　　　　　　　Commissioner of Patents